(12) United States Patent
Cardarelli

(10) Patent No.: US 8,397,568 B2
(45) Date of Patent: Mar. 19, 2013

(54) BIAS MEASUREMENT FOR MEMS GYROSCOPES AND ACCELEROMETERS

(75) Inventor: Donato Cardarelli, Medfield, MA (US)

(73) Assignee: Milli Sensor Systems+Actuators, West Newton, MA (US)

( * ) Notice: Subject to any disclaimer, the term of this patent is extended or adjusted under 35 U.S.C. 154(b) by 1410 days.

(21) Appl. No.: 11/739,485

(22) Filed: Apr. 24, 2007

(65) Prior Publication Data

US 2012/0198934 A1    Aug. 9, 2012

Related U.S. Application Data

(63) Continuation-in-part of application No. 11/426,368, filed on Jun. 26, 2006, now Pat. No. 7,406,867.

(60) Provisional application No. 60/745,438, filed on Apr. 24, 2006.

(51) Int. Cl.
*G01C 19/56* (2006.01)
*G01P 9/00* (2006.01)

(52) U.S. Cl. ............... 73/504.12; 73/504.04; 73/511

(58) Field of Classification Search .............. 73/504.03, 73/504.02, 504.08, 504.09, 504.04, 510, 73/511, 504.12

See application file for complete search history.

(56) References Cited

U.S. PATENT DOCUMENTS

| 5,712,426 | A * | 1/1998 | Sapuppo et al. | 73/504.03 |
|---|---|---|---|---|
| 6,725,719 | B2 * | 4/2004 | Cardarelli | 73/504.04 |
| 6,859,751 | B2 * | 2/2005 | Cardarelli | 702/141 |
| 7,066,004 | B1 * | 6/2006 | Kohler et al. | 73/1.38 |
| 7,191,636 | B2 * | 3/2007 | Jaffe | 73/1.77 |
| 7,549,334 | B2 * | 6/2009 | Cardarelli | 73/504.13 |
| 2007/0240486 | A1 | 10/2007 | Moore et al. | |
| 2007/0245800 | A1 | 10/2007 | Shirasaka et al. | |

* cited by examiner

*Primary Examiner* — Helen C. Kwok
(74) *Attorney, Agent, or Firm* — Brian M. Dingman; Mirick, O'Connell, DeMallie & Lougee, LLP

(57) ABSTRACT

A system and method for separating bias instability of MEMS inertial instruments such as gyroscopes or accelerometers from the instrument signal, in which the inertial measurement instrument has an input axis and an output signal, and the bias instability has a frequency. The instrument is rotated about a rotation axis that is orthogonal to the input axis, at a frequency that is greater than the bias instability frequency. The instrument output signal is detected, and demodulated with a phase-sensitive detection method referenced to the instrument rotation.

16 Claims, 13 Drawing Sheets

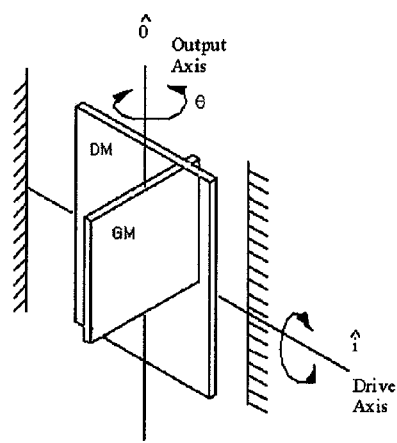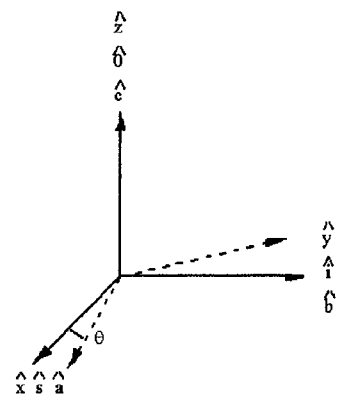
Figure 1A                    Figure 1B

BIAS MEASUREMENT FOR MEMS GYROSCOPES AND ACCELEROMETERS

CROSS REFERENCE TO RELATED APPLICATION

This application is a continuation in part of application Ser. No. 11/426,368 filed on Jun. 26, 2006 now U.S. Pat. No. 7,406,867, the disclosure of which is incorporated herein by reference. This application claims priority of Provisional application Ser. No. 60/745,438, with a filing date of Apr. 24, 2006, the disclosure of which is incorporated herein by reference.

STATEMENT REGARDING FEDERALLY SPONSORED RESEARCH

This invention was made with government support under contract number W911QY-06-C-0096 issued by Department of the Army. The government has certain rights in this invention.

FIELD OF THE INVENTION

This invention relates to MEMS inertial instruments such as gyroscopes and accelerometers.

BACKGROUND OF THE INVENTION

Micro-electro-mechanical systems (MEMS) gyroscopes and accelerometers, such as disclosed in U.S. Pat. Nos. 6,725, 719 and 6,859,751, are generally planar instruments. Due to their very small size, and materials and methods of construction, such MEMS inertial instruments are relatively sensitive to ambient temperature and other environmental factors. These sensitivities makes them relatively unstable. Accordingly, it has been necessary to extensively test such instruments under a variety of conditions in order to develop a priori compensation schemes that can then be built into systems employing such instruments. This testing is time consuming and expensive, and also may not anticipate every possible condition that the instrument may be exposed to, which can lead to errors.

The accuracy of Microelectromechanical Systems (MEMS) gyroscopes and accelerometers depends on the stability of their bias. Bias is the non-zero instrument output in the absence of input. The bias has deterministic and random components. Each deterministic component can be related to a cause, which potentially can be controlled. Random components can be traced to a cause but cannot be controlled. The pertinent random component for this invention is the 1/f noise, which is related to intrinsic shot noise in the electronics and Brownian motion due to atoms colliding with the mechanical structures. The bias, as an offset value, can vary from turn-on to turn-on. The deterministic component can vary as a drift.

The problem is that under motion, the instrument bias is undistinguishable from the signal generated by the motion, hence the output in incorrect and the MEMS instrument is impractical and requires continuous correction to be useful.

SUMMARY OF THE INVENTION

The G2-Gyroscope is a Coriolis gyroscope where the drive and output sense motions are angular oscillations. Its structure is generally planar and composed of two members: a Gyro Member and a Drive Member. The Gyro Member is the gyro. The Drive Member supports the Gyro Member above the substrate and is used to oscillate the Gyro Member about the Drive Axis, without applying direct actuation to the Gyro Member. Under rotation rate input, the Gyro Member responds by oscillating about the Output Axis (orthogonal to the Drive Axis). The Input Axis and Drive Axis are orthogonal to each other and lie in the plane of the gyroscope. The Output Axis is aligned normal to the plane. An attribute of this design is that the Gyro Member can be made symmetric about the Output Axis and therefore reduce sensitivity to cross-axis rotation rate inputs. By using the Drive Member to indirectly drive the Gyro Member, error torques are minimized.

The inventive G2-Gyroscope design is a planar MEMS instrument that is suited for integration into a planar MEMS Inertial Measurement Unit (IMU) whereby gyroscopes and accelerometers, formed onto a single substrate, sense all six-degrees-of-freedom. The G2-Gyroscope is also operational on its own.

This invention relates to designs of the G2-Gyroscope with built-in bias stabilization capability.

This invention further relates to planar G2-Gyroscope designs with built-in bias stabilization capability capable of being fabricated with MEMS processing technologies.

This invention further relates to the symmetry of the Gyro Member about the Output Axis to reduce sensitivity to cross-axis rotation rates.

This invention further relates to the indirect drive of the Gyro Member through a Drive Member (DM), to which the Gyro Member is attached. The purpose is to minimize unwanted drive of the Gyro Member about the Output Axis (quadrature source).

This invention further relates to the components of the design and how they provide functionality to operate the gyroscope with built-in scale factor measurement capability.

This invention also relates to the alternate design where the Gyro Member is larger and driven directly to oscillate about the Drive Axis. The larger size of the Gyro Member increases gyroscope sensitivity. In this case, the member that supports the gyro member relative to the substrate is not driven, and thus is not really a "Drive Member." This member may thus be generally termed, for both preferred embodiments, a "support member."

Although the gyroscope can be operated with any set of Drive Member and Gyro Member (also referred to as Inner Member) natural frequencies, the sensitivity is improved as the difference between them (offset) is reduced. Operation with an offset of zero is the most sensitive and represents a special case.

This invention addresses methods to separate both deterministic and random bias components from the signal and enable long-term use of the instrument, without correction updates. In GPS/INS applications, the bias stabilized gyro can operate independently of the GPS system and further provide a check on its accuracy. The bias stabilized gyro can also operate autonomously.

The invention separates the bias from the gyroscope and accelerometer signals in two steps by: 1. modulating the instrument signal at a frequency that is larger than the bias instability and 2. demodulating the signal with a phase sensitive detection method (see A. J. Diefenderfer, Principles of Electronic Instrumentation, W. B. Saunders Pub., Philadelphia 1972, Ch. 12-Noise, pp. 473-487) referenced to the source of the modulation.

The invention combines signal modulation with phase sensitive detection methods applied at a high rate, which is necessary for MEMS instruments because their bias instability has a larger spectral content.

The phase sensitive detection method becomes more efficient at higher rates.

The phase sensitive detection method can be carried out numerically or electronically. If carried out with digital electronics, the two become the same.

The gyro signal modulation is generated by rotating the instrument Input Axis (IA) about an orthogonal axis. The gyro signal is maximum when the gyro IA is aligned with an Input Rotation Rate Axis, about which the vehicle rotates. The signal is zero when the instrument IA is orthogonal to the Input Rotation Rate Axis.

The accelerometer signal modulation is generated by rotating the instrument Input Axis (IA) about an orthogonal axis. The accelerometer signal is maximum when its IA is in-line with the Input Acceleration Axis, along which the vehicle accelerates. The signal is zero when the instrument IA is orthogonal to the Input Acceleration Axis.

There are three Body Axes for the vehicle: a-Axis, b-Axis and c-Axis. The gyroscopes and accelerometers are arranged with three IMU axes: X-Axis, Y-Axis and Z-Axis. The X-Gyro Input Axis is aligned with the X-Axis, etc. During the rotation of the IMU, the c-Axis and Z-Axis are parallel. The X and Y instruments rotate about the c-Axis. The rotation is carried out by a Carousel and the rotation axis is also the Carousel Axis.

For the case where all the instruments are part of a common member, and one rotation axis is designated, the instruments aligned with the rotation axis will not be stabilized by this invention. The instruments aligned with the other two orthogonal axes will be rotated and their signals modulated as their Input Axes are rotated relative to the body axes. Two rotation axes and instrument set-ups are required to stabilize instruments for all six degrees of freedom.

For the case where all the instruments are planar and located on the same planar substrate, the common substrate can be rotated about the rotation axis. The instruments with Input Axes in the plane are stabilized by the rotation. As the in-plane instruments are rotated they sense components of rotation rate and acceleration from the two co-planar Body Axes. The signal from each in-plane gyro and accelerometer will contain the vector sum of the input rotation rates about the separate in-plane Body Axes.

Phase sensitive detection is used to separate the two orthogonal rotation rates and accelerations by using rotation phase references tied to the two Body Axes, which are orthogonal. A resolver is used to measure the carousel rotation and develop the reference waveforms.

During rotation, the bias is not modulated. The bias is therefore essentially filtered.

The carousel approach was applied to the much larger mechanical instruments with a rotation rate on the order of a revolution/minute, sufficient to eliminate the deterministic drift and not adversely affect the instruments. The 1/f instability was much lower than the signal and was not a consideration.

For MEMS, instruments, however, which are much smaller, the bias drift is larger and the 1/f instability much more significant. The carousel requirement for the MEMS case is a much larger rotation rate, the value of which is dependent on the temporal instability of the 1/f noise and the requirement of the phase-sensitive detection method.

The carousel method works equally as well for the MEMS gyroscopes and accelerometers. The primary requirement for the instruments, however, is for the instruments not to be affected by the carousel rotation (zero cross-axis sensitivity).

This invention works well with the G2-Gyro described herein because of its low cross-axis sensitivity. This invention also works with other MEMS gyroscope and accelerometer designs.

This invention also relates to the use of high carousel rates to stabilize instrument operation to include 1/f instability. This applies to MEMS as well as non-MEMS instruments where high carousel rates are tolerated.

The invention can be mechanized with a carousel (planar or bulk) on which is placed the planar or bulk IMU or any number of gyroscopes and accelerometers, of which, those with in-plane axes are stabilized.

The invention also relates to a platform to apply continuous rotation of the instrument at a constant rate.

A rotary pick-off (angle resolver) is used to measure the angle of rotation. The angle of rotation is used to develop the demodulation reference waveform, which are phased to the in-plane Body Axes.

The invention also relates to the use of one in-plane gyroscope to measure Input Rotation Rates about both in-plane Body Axes. The use of the same gyroscope to measure both Input Rates reduces a source of error between the rates of the two Body Axes.

The invention also relates to the use of one in-plane accelerometer to measure both components of acceleration along both in-plane Body Axes.

The invention also relates to the use of two accelerometers aligned along the same axis and located on opposite ends of the IMU center. Since each in-plane accelerometer experiences the carousel rotation as well as the carousel rate and c-Axis rotation rate, the rotation content can be differenced from the accelerometer signal since the accelerometers displace in opposite directions due to the rotation but in the same direction due to the acceleration input.

The invention also relates to the use of both gyroscopes (X and Y) to double the measurements for greater accuracy or for redundancy.

The invention also relates to the use of X-accelerometers and Y-accelerometers together to double the measurement for greater accuracy or for redundancy.

A smaller IMU is possible consisting of one Z-gyro (aligned with the Carousel Axis), one in-plane gyro, one Z-accelerometer and one in-plane accelerometer, because of the carousel method.

The invention also relates to the combination of carousel rotation and the phase-sensitive detection method to eliminate bias drift and 1/f bias instability from the gyro and accelerometer signals. And because of carousel rotation, the IMU requires one in-plane gyro and one in-plane accelerometer as well as the Z-instruments, which reduces the size and complexity of the IMU.

BRIEF DESCRIPTION OF THE DRAWINGS

Other objects, features and advantages will occur to those skilled in the art from the following descriptions of the preferred embodiments, and the accompanying drawings, in which:

FIGS. 1A and B are stick figures representing the inventive G2-Gyroscope design structure.

DESCRIPTION OF THE PREFERRED EMBODIMENTS OF THE INVENTION DESIGN GUIDELINES

Figure 2:
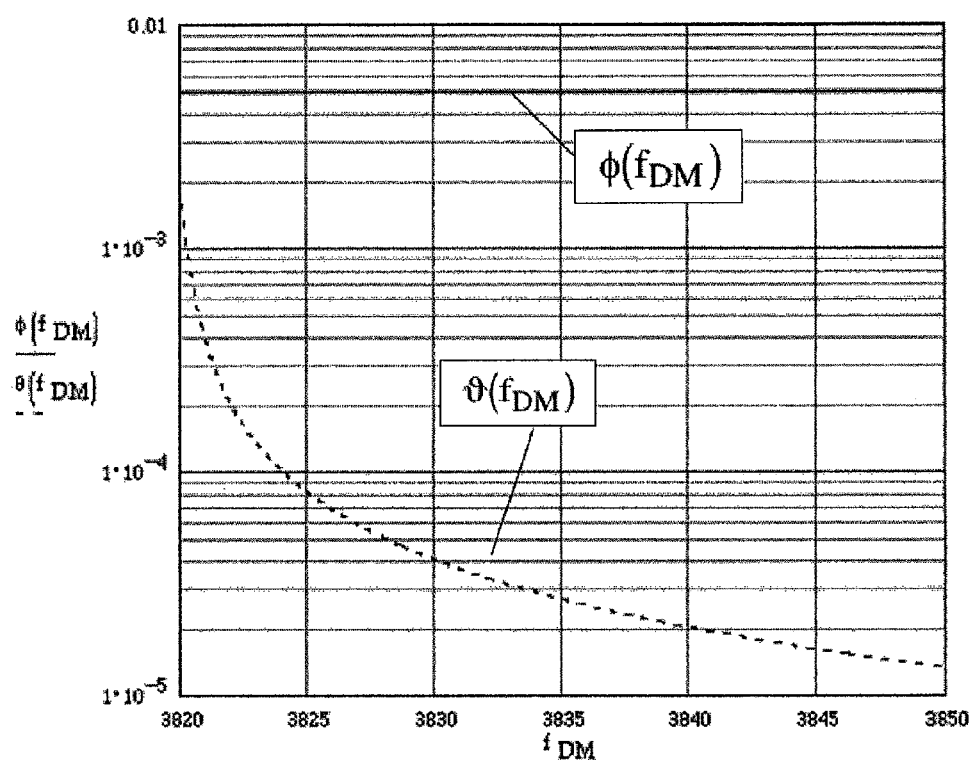
FIG. 2 is a graph of the Gyro signal dependence with offset frequency.

The design of one preferred embodiment of the invention incorporates:
- a symmetric disk (Gyro Member or "GM" herein) in the plane of the instrument that is driven to oscillate about an axis in the plane (Drive Axis), by the use of an outer structure, the Drive Member; the gyro output motion is the oscillation of the disk about the axis normal to the plane (Output Axis); the purpose of the symmetric disk is to reduce sensitivity to cross-axis rotation rate,
- the disk is mounted to the Drive Member (DM) so that the drive of the disk about the Drive Axis is accomplished through the DM structure and actuation is not applied directly to the disk itself; the purpose is to minimize the inadvertent drive of the disk about the Output Axis,
- the Drive Member is connected with a pair of torsional flexures to bonding pads attached to the substrate,
- a mesa between the bonding pads and the substrate provides the working gap that allows motion of the GM and DM about the drive axis,
- a set of radial flexures suspends the disk from the Drive Member and allow its oscillation about the Output Axis,
- each radial flexure incorporates stress reliefs to minimize the DM stress imparted on the disk that affects its free motion,
- actuation of the Drive Member is done with two sets of capacitor plates located underneath the DM and on both sides of the Drive Axis,
- motions of the disk and Drive Member are sensed with capacitive pick-offs that operate differentially to cancel common-mode noise; at zero rotation rate, the difference in capacitance is zero and the output is zero,
- the mechanical structure consists of two moving members cut from one material (monolithic construction); the full structure is connected electrically to ground (or common potential),
- the monolithic structure is mounted onto a rigid substrate onto which are also located the stators for driving (actuating) and sensing the motion of the members,
- the rigid substrate provides a stable base for the gyroscope and maintains its alignment,
- the Pyrex base is a material that enables anodic bonding of the epitaxial silicon to the Pyrex; its electrical insulation property separates the gyroscope from other devices that may be located on the same substrate,
- the thickness of the gyroscope structure is sufficiently large that the members oscillate as thin plates with little structural distortion, and
- the working gap is large enough to prevent stiction to the substrate.

Modeling

G2-Gyroscope Structure

The G2-Gyro structure is based on two nested members that oscillate in angle about orthogonal axes defined by two sets of flexures as shown in FIGS. 1A and 1B. The inner member (IM) is called the Gyro Member (GM) and the outer member (OM) is called the Drive Member (DM). The Gyro Member is mounted with flexures to the Drive Member and rotates by angle θ relative to the Drive Member. The DM is mounted to the case (substrate) with flexures and rotates by angle φ relative to the case (substrate). Since the gyroscope is an oscillatory device, the angles θ,φ are small. The two sets of flexures define axes of rotation that are orthogonal. There are three co-ordinate axes that apply; the first, (s, i, o) is fixed to the Gyro Member; the second, (x, y, z) is fixed to the Drive Member and the third, (a, b, c) is fixed to the case and rotates in inertial space. The case angles of rotation are not limited. The Gyro Member equation of motion describes the motion of the GM under rotation in inertial space and describes the output of the gyro.

Equation of Motion

Analysis is used to derive the equation of motion for the Gyro Member when the Drive Member is oscillated at some frequency and amplitude as the Case undergoes rotation in inertial space. The resultant equation of motion is given by $$I_{GM}\ddot{\vartheta} + D_{GM}\dot{\vartheta} + \qquad (1)$$

$$\left[K_{GM} + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t\right]\Delta I\left]\vartheta - \right.$$

$$\{(\Omega_b^2 - \Omega_a^2) + (\Omega_a\Omega_b + \Omega_a\Omega_c\tilde{\phi}\sin\omega t + \Omega_a\tilde{\phi}\omega\cos\omega t)\vartheta^2 =$$

$$I_{GM}\Omega_a\tilde{\phi}\omega\cos\omega t - \Delta I(\Omega_a\Omega_b + \Omega_b\Omega_c\tilde{\phi}\sin\omega t + \Omega_a\tilde{\phi}\omega\cos\omega t)$$

where

| | |
|---|---|
| $I_{GM}$: | GM moment of inertia about the o-axis (Output Axis) |
| $D_{GM}$: | GM damping |
| $K_{GM}$: | GM flexure stiffness (spring constant) |
| θ: | rotation angle of the GM relative to the DM |
| φ: | DM rotation angle relative to the case |
| $\Omega_a, \Omega_b, \Omega_c$: | rotation rates of the case in inertial space about three axes |
| $\Delta I = I_i - I_s$: | difference of GM inertias about the i-axis and s-axis |

-continued $\phi = \tilde{\phi}\sin(\omega t)$: DM oscillatory angular motion
$\dot{\phi} = \omega\tilde{\phi}\cos\omega t$: rate of DM angular motion To the left of the equals sign are included the torque terms dependent on inertia, damping and stiffness as well as a nonlinear (fourth) term dependent on GM angle squared. The stiffness (third) term is given by $$\left[K_{GM} + \left\{(\Omega_b^2 - \Omega_a^2) + \frac{1}{2}(\omega^2 - \Omega_c^2)\tilde{\phi}^2 - 2\Omega_a\Omega_c\tilde{\phi}\sin\omega t + 2\Omega_b\tilde{\phi}\omega\cos\omega t\right\}\Delta I\right] \quad (2)$$

The stiffness term includes a constant flexure stiffness, $K_{GM}$, and a component dependent on vehicle rotation rates, $\Omega_a, \Omega_b, \Omega_c$, DM drive frequency, $\omega$, and a factor referred to as the tuning inertia, $\Delta I$.

On the right of the equals sign are given terms that drive the GM. They include a gyroscope torque due to rotation rate about the Input Axis and others due to case rotation about cross-axes that are coupled by the tuning inertia. They are respectively:

$I_{GM}\Omega_a\tilde{\phi}\omega \cos \omega t$ and $\Delta I(\Omega_a\Omega_b + \Omega_b\Omega_c\tilde{\phi}\omega \sin \omega t + \Omega_a\tilde{\phi}\omega \cos \omega t)$.

G2-Gyro Mechanization/Mechanical Response

From the equation of motion, the gyroscope operation is simplified by making the GM symmetric about the o-axis (Output Axis) so that $\Delta I=0$. The resultant equation of motion becomes $$I_{GM}\ddot{\theta} + D_{GM}\dot{\theta} + K_{GM}\theta = I_{GM}\Omega_a\tilde{\phi}\omega \cos \omega t \quad (3)$$

The interpretation is that of a simple harmonic GM oscillator driven externally by a gyroscopic torque that results from the oscillatory motion of the DM and input rotation rate. Rewriting the GM EOM in the "Standard Form", we get $$\ddot{\theta} + 2\xi_{GM}\omega_{GM}\dot{\theta} + \omega_{GM}^2\theta = \tilde{\phi}(\omega)\omega\Omega_a \cos \omega t \quad (4)$$

where $$2\xi_{GM}\omega_{GM} = D_{GM}/I_{GM} \quad (6)$$

$$\xi_{GM} = \frac{1}{2}\frac{D_{GM}}{I_{GM}\omega_{GM}}$$

$\xi_{GM}$ is the GM damping factor, and $$\omega_{GM}^2 = K_{GM}/I_{GM}$$

$$\omega_{GM} = \sqrt{\frac{K_{GM}}{I_{GM}}}$$

where $\omega_{GM}$ is the GM natural frequency.

The solution describes the oscillatory motion of the GM in response to gyroscope input rotation rate, and is given by $$\theta(t) = \tilde{\theta}\sin(\omega t - \epsilon_{GM}) \quad (7)$$

where $\tilde{\theta}$ is the GM oscillatory amplitude and $\epsilon_{GM}$ is the GM oscillation phase relative to the gyroscopic drive.

$$\tilde{\theta}(\omega) = \frac{\frac{I_{GM}}{K_{GM}}\Omega_a\omega\tilde{\phi}(\omega)}{\left[\left(2\xi_{GM}\frac{\omega}{\omega_{GM}}\right)^2 + \left(1 - \frac{\omega^2}{\omega_{GM}^2}\right)^2\right]^{1/2}} \quad (8)$$

$$\epsilon_{GM}(\omega) = \tan^{-1}\left(\frac{2\xi_{GM}\frac{\omega}{\omega_{GM}}}{1 - \frac{\omega^2}{\omega_{GM}^2}}\right) \quad (9)$$

These solutions can be plotted to obtain the Transfer Functions or Bode of the GM. Note that the response is also dependent on the DM amplitude, which also varies with angular frequency (the GM is coupled to the DM).

Practical Gyroscope Case—Offset Operation

For the practical gyroscope, the DM is driven at resonance to minimize the drive voltage and to maximize the DM oscillation amplitude. The GM response then depends on the GM and DM natural frequencies (note that the DM comprises the gyro disk for purposes of calculating the DM inertia about the Drive Axis and the DM natural frequency). The maximum DM amplitude and phase at resonance are given by $$\tilde{\phi}(\omega_{DM}) = \frac{\tilde{\Gamma}_{DM}}{D_{DM}\omega_{DM}} \quad (10)$$

$$\epsilon(\omega_{DM}) = \frac{\pi}{2}$$

where $$\Gamma_{DM} = \frac{V^2}{2}\frac{\delta C}{\delta \phi} \quad (11)$$

is the torque applied by the capacitive actuator. The GM responses for amplitude and phase for GM and DM natural frequencies are $$\tilde{\theta}_{Out} = \tilde{\theta}(\omega_{DM}) = \frac{\frac{I_{DM}}{K_{DM}}\Omega\omega_{DM}\tilde{\phi}(\omega_{DM})}{\left[\left(2\xi_{GM}\frac{\omega_{DM}}{\omega_{GM}}\right)^2 + \left(1 - \frac{\omega_{DM}^2}{\omega_{GM}^2}\right)^2\right]^{1/2}} \quad (12)$$

$$\epsilon_{GM}(\omega_{DM}) = \frac{\pi}{2} + \tan^{-1}\left(\frac{2\xi_{GM}\frac{\omega_{DM}}{\omega_{GM}}}{1 - \frac{\omega_{DM}^2}{\omega_{GM}^2}}\right) \quad (13)$$

Matched Frequency Case: Zero Offset

The maximum sensitivity is obtained for the case in which the DM and GM resonances are matched, $\omega_{DM}=\omega_{GM}$. The output per rotation rate input (Scale Factor) then is given by $$\tilde{\theta}_{matched} = \frac{I_{GM}}{D_{GM}}\tilde{\phi}\Omega_a \quad (14)$$

The output amplitude is dependent directly on the GM inertia, inversely with damping and directly with DM oscillation amplitude. A vacuum is necessary to develop the proper damping. In this case, it can readily be seen that the gyro sensitivity scales with size and inversely with damping.

General Offset Description

Gyro sensitivity is dependent on the separation (offset) between the GM and DM natural frequencies. In FIG. 2 is plotted the modeled dependence for a typical gyro case. The top curve is of the DM amplitude $\phi(f_{DM})$ and it is held constant. The lower curve is of the GM amplitude response for an input rotation rate of 1 rad/sec. Its amplitude $\theta(f_{DM})$ depends on the DM frequency and it increases as the offset is reduced.

G2-Gyro Requirements the DM is driven at resonance to the maximum amplitude possible as limited by the working gap between the device and the substrate, a phase-lock loop is used to maintain the operation of the DM at resonance, the DM amplitude is held constant with an amplitude control loop, the DM-GM frequency offset is held constant, excitation frequencies for operating the DM and GM capacitive sensors need to be sufficiently different to minimize pick-up between them, GM and DM oscillation axes are orthogonal to prevent drive of the GM by the DM oscillation, and DM actuation is done without actuating the GM directly.

G2-Gyro Operation

The DM is driven at some frequency and amplitude about the Drive Axis. When the gyro is rotated about the Input Axis (orthogonal to both the Drive Axis and Output Axis), the GM responds with an oscillation amplitude that is proportional to the Input Rotation Rate. Demodulation of the oscillatory output with a reference waveform at the same frequency and with the appropriate phase generates a gyro output DC voltage proportional to the Input Rotation Rate.

G2-Gyro Quadrature

A signal that is in "quadrature" with the gyro signal is an error signal generated by the improper operation of the gyroscope and the gyroscope design. Fortunately it is always out of phase by 90 degrees with the gyro signal and can be separated and filtered by proper demodulation. The phase of the demodulation reference waveform is to be controlled to prevent leakage of the quadrature signal into the gyro signal channel.

G2-Gyro Scope Embodiment

Mechanical Design

Figure 3:
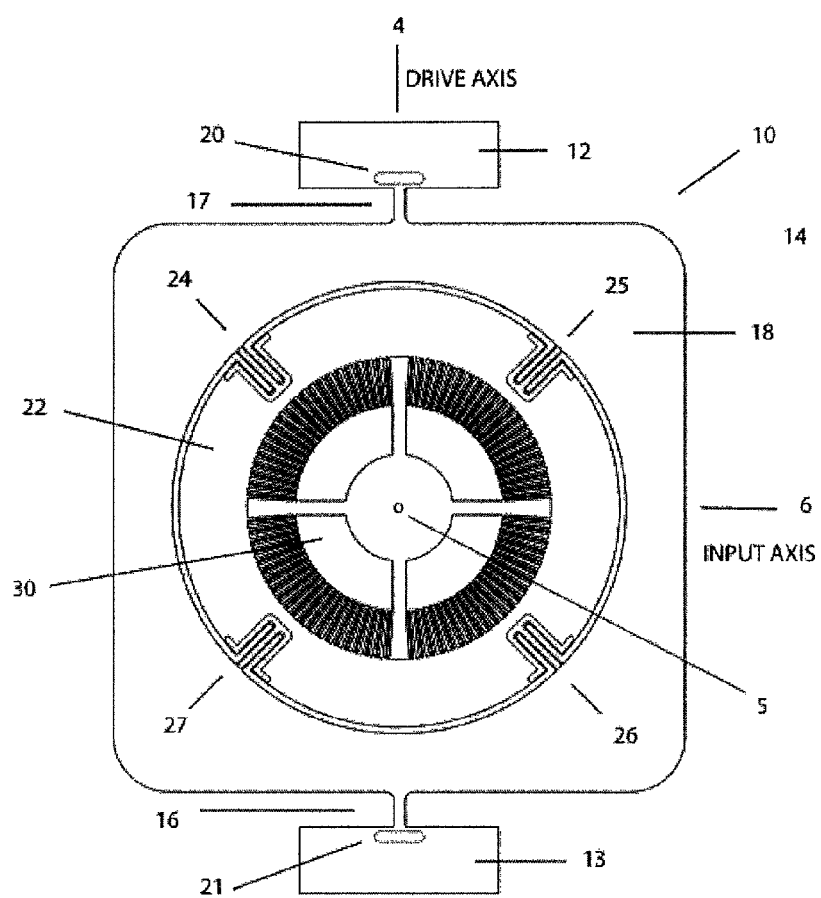
FIG. 3 is a top view of one embodiment of the inventive G2-Gyroscope mechanical design.
Figure 4:
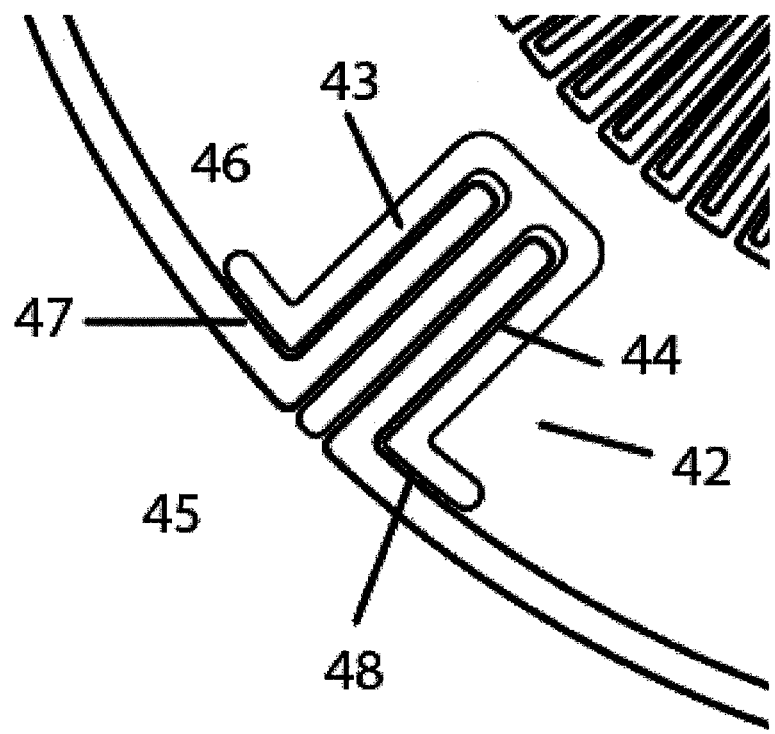
FIG. 4 is a close up view of the W-flexure of the G2-Gyroscope of FIG. 3.

The mechanical design of one preferred embodiment of the inventive G2-Gyroscope 10 is shown in FIG. 3. The rectangular shapes on each end are bonding pads 12, 13 used to bond the device to the Pyrex substrate 14. Two torsional flexures 16, 17 connect the Drive Member 18 to the bonding pads. The flexures are stress-relieved by the oval cutouts 20, 21 in the bonding pads. The square DM shape allows the placement of sufficiently large capacitive plates underneath for actuation. Sense plates are used to measure the motion of the DM. The Gyro Member 22 is an annular disk connected to the DM with four W-shaped flexures 24, 25, 26, 27. The W-flexure design 42 shown in FIG. 4 is made up of two U-shaped flexures 43, 44. One end of each is connected to the DM 45 and the other to the GM disk 46 through L-shaped segments 47, 48 essentially tangent to the disk curvature. The L-shaped segment is added to enable the U-structure to bend with GM rotation and to absorb stress between the DM and GM. The radial alignment of the flexures along diagonals across the DM makes a symmetric arrangement with each flexure experiencing the equivalent stress.

The working gap between the gyro structure and the Pyrex substrate is 10 microns but the gap used depends on several factors: geometry, actuation capacity, sensitivity and fabrication constraints. The gap is fabricated by etching a well in the silicon and a well in the Pyrex.

The use of Pyrex is dependent on the need to anodically bond epitaxial silicon to a substrate as described below in the DWP process. Other processes are possible. It is preferred to use a substrate that has similar thermal characteristics to the device material, which in this case is silicon. An option is to also use silicon as the substrate for a close thermal match and to enable anodic bonding with a deposited Pyrex-equivalent film added to the substrate silicon. This would also preserve the electrical isolation between devices on the same substrate.

It is preferred for the device to be monolithic for mechanical stability and to connect it to electrical ground.

On the inside diameter of the GM is constructed a radial comb 30 for sensing the rotation of the GM. The comb teeth are aligned radially with the GM center of rotation. Four sets of mating combs are constructed on four separate quadrants fixed separately to the substrate that serve as stators for the moving comb rotor on the GM. By connecting the bonding pads to traces, the silicon structure is connected to electrical ground.

The gyro is driven by actuation of the DM about the Drive Axis 4. The Output Axis 5 is normal to the plane of the DM. The Input Axis 6 is orthogonal to the other two.

Rotary Comb Capacitive Sensor

Figure 5:
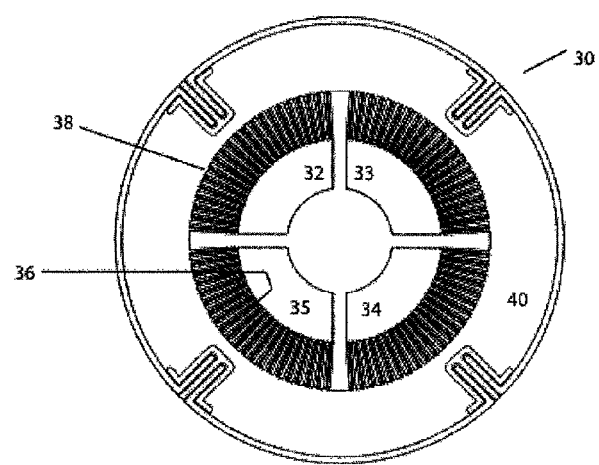
FIG. 5 is a close up view of the rotary comb design of the gyro of FIG. 3.

The rotary comb design 30 is illustrated in FIG. 5. It is separated into four quadrants 32, 33, 34, 35. For each quadrant, the comb is divided into a stator with stator comb fingers 36 attached to the substrate 14 and a rotor with rotor comb fingers 38 that are part of the moving GM disk structure 40. The stator fingers and rotor fingers are aligned radially with the center of rotation of the disk. For each rotor finger there is a stator finger with the two separated by a small gap. They make up a comb finger pair. Pairs of comb fingers are separated by a large gap. A number of comb finger pairs makes up each quadrant. The sensitivity of the comb sensor scales with the number of comb finger pairs. By reducing the small gap between the comb finger pairs, the sensitivity is increased.

Figure 6:
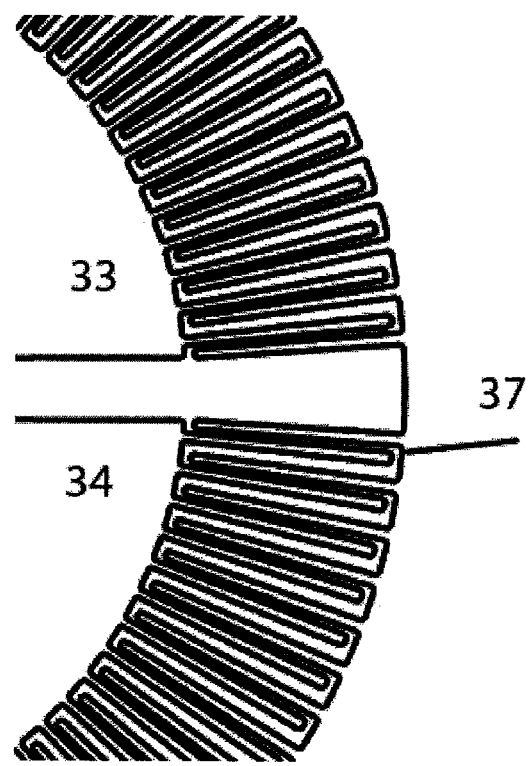
FIG. 6 shows the differential alignment between rotary comb quadrants of the rotary comb shown in FIG. 5.

Neighboring quadrants 33, 34 are designed symmetrically about the axis that separates them as shown in FIG. 6. For rotation of the rotor in either direction, the small gap 37 of comb finger pairs in one quadrant decreases while the small gap of comb finger pairs in the other quadrant increases. The purpose of the rotary design, based on neighboring quadrants, is that when the signals from the comb finger pairs located on neighboring quadrants are differenced, the signals add and the common-mode noise subtracts; this is differential operation. At zero rotation of the GM, the output is also zero. When the output from the third and fourth quadrants are added to the first and second, the signal is doubled again. This is the preferred operation of the rotary comb of the gyro for maximum sensitivity.

Alternate uses of the rotary comb are possible if one set of neighboring quadrants is connected for rotary sensing and the other set for actuation. One use is to test the operation of the Gyro Member separately. The second use is to cancel quadrature error by adding a counter motion of the Gyro Member.

Metallization Design of the G2-Gyroscope

Figure 7:
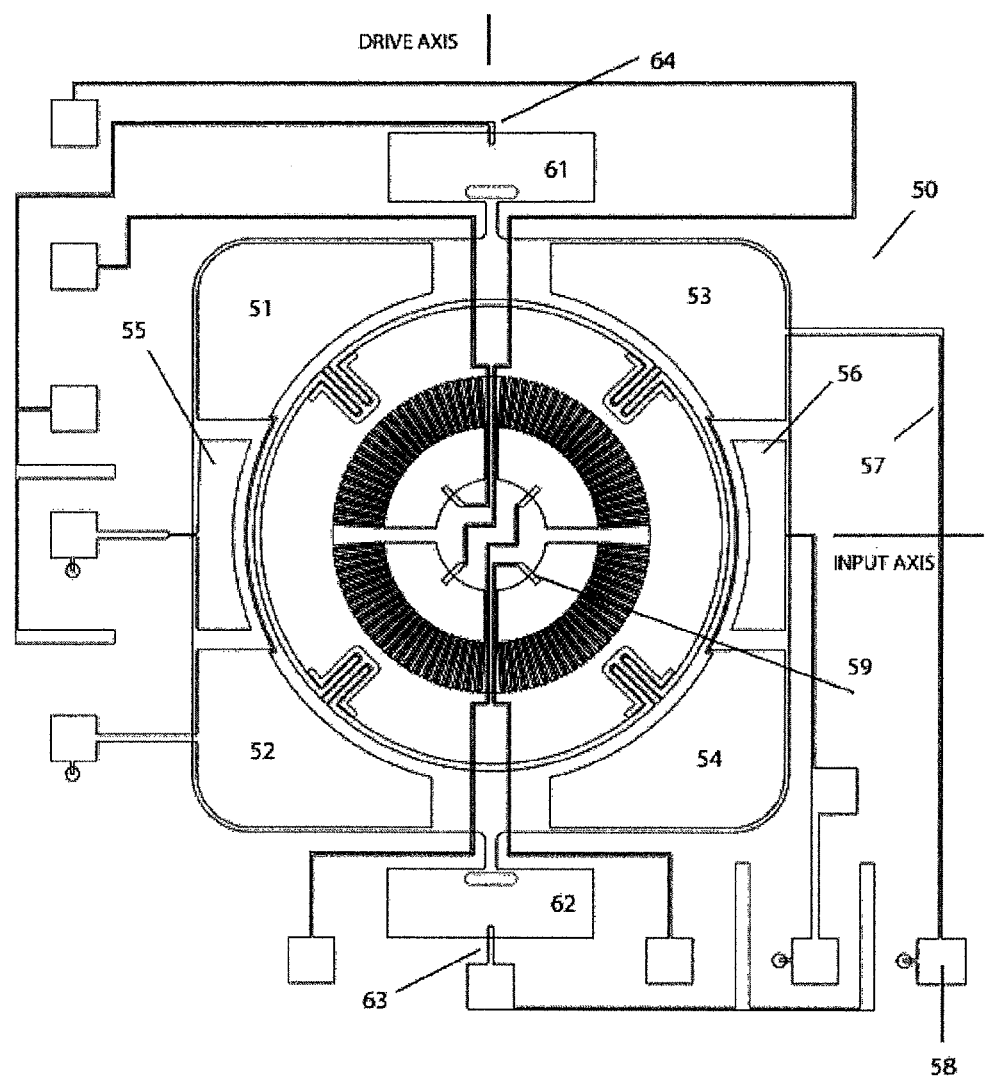
FIG. 7 is a schematic representation of the G2-Gyro metallization design for the embodiment of FIGS. 3-6.

The metallization design 50 is shown in FIG. 7. It consists of capacitive plates, conductor traces and pads. Capacitive plates 51 and 52 are located under part of the DM on one side of the Drive Axis. They are connected by a trace. Capacitive plates 53, 54 are located on the other side. They are connected by a trace. Drive voltages are applied to the actuator plates to predominantly pull down on one side of the DM during the first half of the drive cycle and to predominantly pull down on the other side of the DM during the second half of the drive cycle. The result is an oscillatory motion of the DM about the Drive Axis. The sensing of the DM motion is accomplished with two capacitive plates 55, 56. The outputs are connected differentially, since for any motion, the gap for one increases and the gap for the other decreases.

Trace 57 connects capacitive plates 53, 54 to pad 58, for example.

Stators of the rotary comb are connected to pads with traces 59 that are crimped between the stator structure and the Pyrex substrate during anodic bonding. The monolithic gyro structure containing the GM and DM is connected to pads by traces 63, 64 crimped between the mounting structures 61, 62 and the Pyrex substrate. The preferred electrical connection of the gyro structure is to ground.

Traces are also capacitive sensing plates when they are located beneath the moving structure and this needs to be taken into consideration. A rule is to make the lengths under the moving parts equal and symmetric. Pick-up between plates and traces is also a consideration. The usual design practices apply. Electrical pick-up can be a source of quadrature in the gyro output.

Flexures

The purposes of flexures are to:
set orientational alignment between members,
govern rotation of the members about prescribed axes, and
provide support for the members of the structure.

The orientational alignment between members is an especially important consideration for the gyroscope because misalignment introduces mechanical coupling between the DM oscillation and the Gyro Member and will generate quadrature error.

The ideal flexure allows only motion about one axis in the dynamic environment.

The support capability is especially important when considering shock capability. It depends on the masses of the members and the spring stiffness of the flexures. Modeling is used to identify the strain on the flexures. A maximum strain level less than one tenth the fracture limit is a good condition to set.

DM Flexure Relief Structure

The stress relief absorbs the tension on the flexure that is due to the differential thermal contraction as the Pyrex and silicon cool from the elevated anodic bonding temperature. The stress can cause a potato-chip deformation of the DM that affects the GM suspended from it.

IM Flexure

The W-flexure enables rotation of the GM about the axis normal to the plane. Four are used in this design. Each W-flexure is composed of two bending U-flexures with a stress relief in each. For cases where the DM applies a tension or compression to the W-flexure, the stress relief can bend and absorb the stress. In this way, the flexure does not kink and inhibit rotation of the GM.

G2-Out Gyroscope—Alternative Preferred Embodiment

Figure 8:
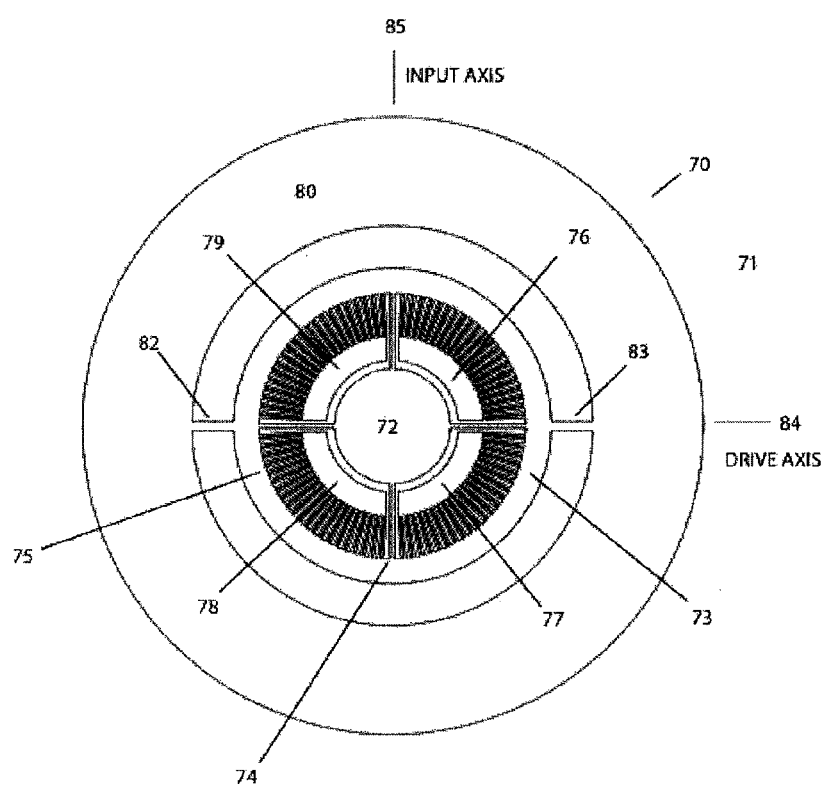
FIG. 8 is a top view of an alternative preferred embodiment of the invention, showing a G2-Out Gyroscope mechanical design.
Figure 9:
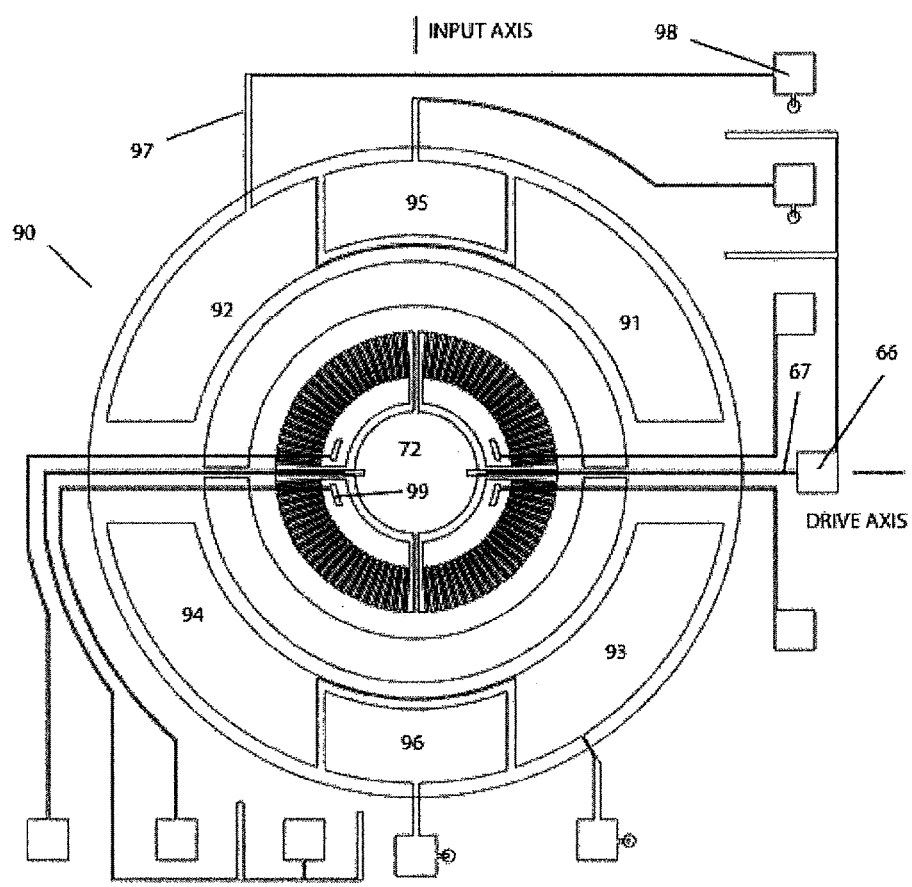
FIG. 9 is a schematic representation of the metallization design for the G2-Out Gyro embodiment of FIG. 8.

The G2-Out Gyroscope 70, FIGS. 8 and 9, is a variation on the G2-Gyroscope where the Gyro Member 80 is the structural outer member, and the Gyro Member is driven directly about the Drive Axis 84. The Output Axis is still normal to the plane. The alignments of the Drive Axis and Input Axis 85 are as specified with the G2 Gyroscope.

Mechanical Design of the G2-Out Gyroscope

The mechanical design of the G2-Out gyro embodiment of the invention is described with FIG. 8. The gyro is mounted to the Pyrex substrate 71 via the mounting post 72 in the center. Ring structure 73 is attached to central post 72 with four radial flexures 74. The radial flexures allow oscillation of the gyro about the Output Axis (normal to the plane). From the ring is attached the rotor 75 of the capacitive rotary comb sensor. The fingers of the rotor extend radially towards the center of rotation. Four radial comb stators 76, 77, 78, 79 are mounted to the Pyrex substrate. The fingers of each stator extend outwards in between the rotor fingers. The radial comb sensor design is identical to the component used for the G2-Gyro.

The ring structure 73 is connected to the disk 80 with two torsional flexures 82, 83. These flexures allow oscillation of the GM about the Drive Axis.

Metallization Design of the G2-Out Gyroscope

The metallization design is similar to that of the G2-Gyro. Plates located beneath the GM disk are used to actuate and sense the motion of the disk about the Drive Axis. Unlike the G2-Gyro, however, the GM is driven directly by the actuator plates. This can lead to direct drive of the disk about the Output Axis (quadrature error). The benefit is that the disk of the G2-Out Gyro is much larger, allowing for greater sensitivity since the inertia is greater.

The metallization design 90 is shown in FIG. 9. It consists of capacitive plates, conductor traces and pads. Capacitive plates 91 and 92 are located under part of the GM disk on one side of the Drive Axis. They are connected by a trace. Capacitive plates 93, 94 are located on the other side. They are connected by a trace. Drive voltages are applied to the actuator plates to predominantly pull down on one side of the disk during the first half of the drive cycle and to predominantly pull down on the other side of the disk during the second half of the drive cycle. The result is an oscillatory motion of the GM disk about the Drive Axis. The sensing of the GM disk motion about the Drive Axis is accomplished with two capacitive plates 95, 96. The outputs are connected differentially since for any motion, the gap for one increases and the gap for the other decreases.

Trace 97 connects capacitive plates 91, 92 to pad 98, for example.

Stators of the rotary comb are connected to pads with traces 99 that are crimped between the stator structure and the Pyrex substrate during anodic bonding. The monolithic gyro structure is connected to pad 66 by trace 67 crimped between the mounting structure 72 and the Pyrex substrate. The preferred electrical connection of the monolithic gyro structure is to ground.

Traces are in themselves capacitive sensing plates when they are located beneath the moving structure and this needs to be taken into consideration. A rule is to make the lengths under the moving parts equal and symmetric. Pick-up between plates is also a consideration. The usual design practices apply. Electrical pick-up can be a source of quadrature in the gyro output.

G2-Out Gyro Operation

For the operation of the G2-Out Gyro, the GM is oscillated about the Drive Axis. With Input Rate applied about the Input Axis, the GM disk also oscillates about the Output Axis. The rotary comb sensor measures the output motion of the GM.

Description of Preferred Electronics

Figure 10:
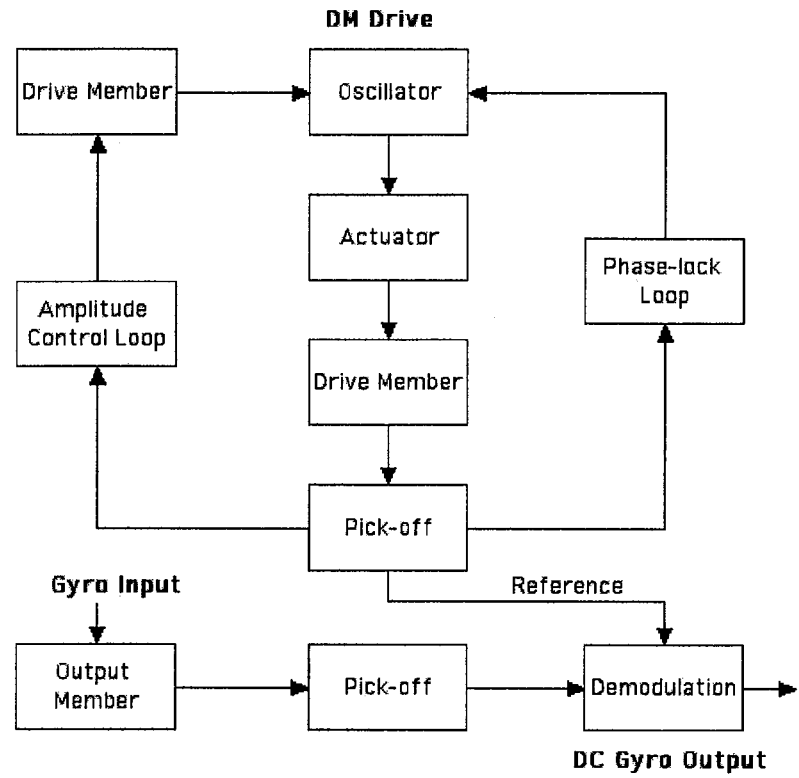
FIG. 10 is a schematic diagram of the preferred electronics for operation of the inventive G2-Gyroscope.

The preferred electronics for the various embodiments of the invention can be described schematically with FIG. 10. An oscillator generates an AC voltage with a frequency close to the DM resonant frequency. The AC voltage is added to a DC bias voltage greater than the AC amplitude to develop a sinusoidal drive waveform. The drive voltage is applied to a set of capacitor plate actuators to drive the DM into oscillation. A set of capacitor plates under the DM is used to sense the motion of the DM about the Output Axis. A Phase-lock loop acts on the phase of the DM signal to keep the DM on-resonance by varying the oscillator frequency. An amplitude control loop compares the DM signal voltage to a reference voltage and varies the AC drive voltage to maintain the DM amplitude constant.

Input rotation rate generates an oscillation of the Gyro Member about the Output Axis with an amplitude that is proportional to the rotation rate. By demodulating the AC output signal with a reference waveform, the gyro output is converted to a DC voltage that is proportional to rotation rate. The gyroscope is operated open-loop.

Dissolved Wafer Processing

Dissolved Wafer Processing (DWP) is a MEMS fabrication process for making relatively large parts with good flatness and square profiles. The process requires two wafers: the first Pyrex and the second silicon, with a Boron-doped epitaxial layer. The combination of materials enables the two wafers to be anodically bonded. The thickness of the epitaxy determines the final device thickness, while Boron doping of the epitaxial layer inhibits EDP etching.

Typical dimensions include: device size of about 3 mm in the plane, device thickness of 40 microns, smallest flexure thickness of 5 microns and gaps between comb fingers of 5 microns.

Four process masks are needed: two for processing the silicon and two for the Pyrex. Instrument functions are distributed between the two layers: the mechanical structure and stator comb components are fabricated in the doped silicon layer and the electrical connections and flat capacitive plate components are deposited onto the Pyrex layer.

Process Steps

Figure 11:
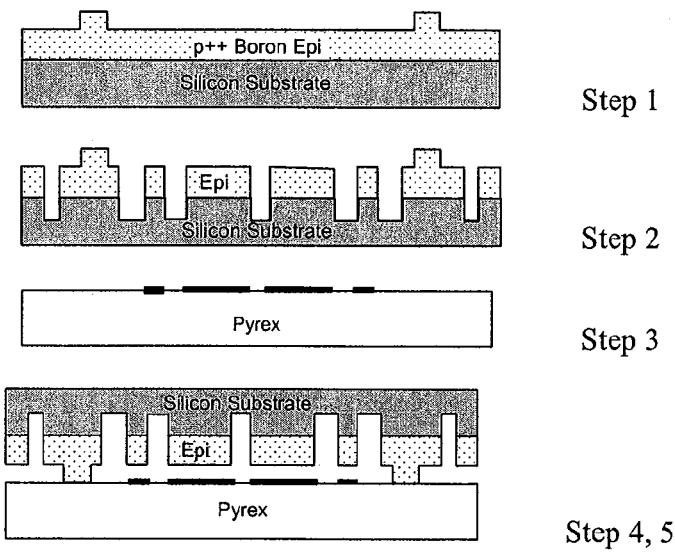
FIG. 11 schematically depicts the dissolved wafer process steps for the preferred manner of fabricating the inventive gyro.
Figure 12:
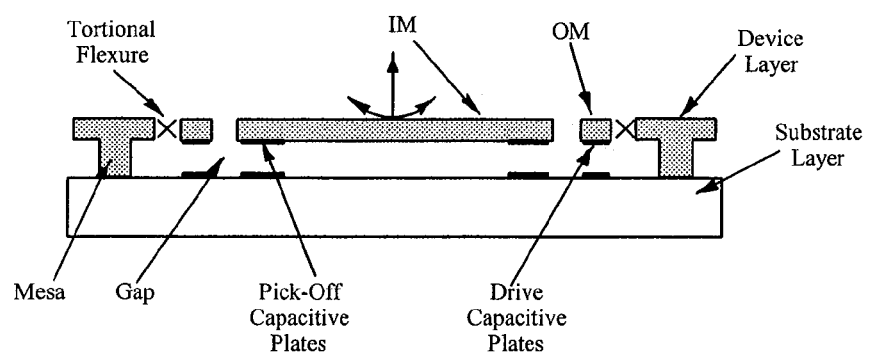
FIG. 12 is a schematic side-view of the completed device from FIG. 3 after the silicon is etched by EDP.

The process steps are described with FIG. 11. The starting silicon wafer includes a grown epitaxial layer with heavy boron diffusion of 43-micron thickness. In step 1, the epitaxial layer is etched to form mesas that support the silicon structures on the Pyrex as patterned by Mask 1. The mesa thickness also sets part of the gap between the device and the substrate that allows motion of parts. In step 2, deep reactive ion etching is used to etch through the epitaxial layer to form the device geometry that includes the structure, mass and combs as patterned with Mask 2. In step 3, wells are formed in the Pyrex to form the rest of the required gap using Mask 3. With Mask 4 (step 4), metal deposited on the Pyrex is patterned to form capacitive plates for driving and sensing out of plane motions. In addition, it patterns traces (conductors) that connect the structure, capacitive plates and the comb stators to the pads. In step 5, the silicon wafer is anodically bonded to the Pyrex wafer at the mesas. In step 6 the wafer is cut with a saw along outlines (streets) that separate devices. Each device is then EDP (Ethylene-Diamene-Pyrocatechol) etched to remove the silicon, leaving behind epitaxial devices with movable parts. The thickness of the devices is equal to the epitaxial thickness minus the mesa thickness, approximately 40 microns for the present devices. A conceptual side view of the finished device is shown in FIG. 12.

Advantages/Disadvantages of DWP

DWP has Several Advantages:

devices are made of one material (doped silicon) for greater thermal stability,
Pyrex serves as a robust substrate since it can be made as thick as desired,
multiple devices can be fabricated on the same Pyrex substrate, while making them physically separate,
thicker doped silicon devices can be made subject to the epitaxial process,
the process is a relatively low-temperature process, thereby generating low internal stresses.

The disadvantages of DWP are not limiting, but can contribute to cost of fabrication and greater design complication. They include:

epitaxial growth limits the device thickness and introduces stresses,
chemical etching of most of the silicon wafer by EDP,
induced stresses from differential expansion of the silicon and Pyrex from the anodic bonding operation, and
reactive ion etching produces some tapering which makes it difficult to attain a desired resonant frequency.

A particularly critical requirement is the formation of flexures with precise geometry having a rectangular cross-section. A small variation in the wall verticality can greatly affect the stiffness and hence the dynamics. A conical cross-section would also have the effect of changing the rotation axis of the GM, and perhaps the orthogonality between the DM and GM axes. This misalignment leads to "quadrature error" in gyroscopes.

Derivation of the Equation of Motion

The analysis prescribed by J. S. Ausman (G. R. Pitman, Jr., Editor, *Inertial Guidance*, University of California Engineering and Physical Sciences Extension Series, J. Wiley and Sons, Inc., New York, 1962, J. S. Ausman, ch. 3) for the gimbal structure of the Single-Degree-of-Freedom Gyroscope is applicable to the common structure of the G2-Gyro.

The fundamental equation applied is that the rate of change of angular momentum is equal to the applied torque:

$$\overline{L} = \left(\frac{d\overline{H}}{dt}\right)_I \tag{15}$$

This is Newton's second law in rotational form. In equation (15) $(d\overline{H}/dt)_I$ is the time rate of change of $\overline{H}$, the angular momentum vector, with respect to inertial space, while $\overline{L}$ represents the applied torque vector. When equation (15) is applied to the GM we get $$\left(\frac{d\overline{H_{GM}}}{dt}\right)_I = \left(\frac{d\overline{H_{GM}}}{dt}\right)_{GM} + \overline{\omega} \times \overline{H_{GM}} = \overline{L_{GM}} \tag{16}$$

where $\overline{H_{GM}}$ is the angular momentum of the GM $$\left(\frac{d\overline{H_{GM}}}{dt}\right)_{GM}$$

is the time derivative of $\overline{H_{GM}}$ relative to the s, i, o coordinate system, and $\overline{\omega}$ is the angular velocity of the GM or s, i, o coordinate system in inertial space.

The GM angular momentum, $\overline{H_{GM}}$, is given by $$\overline{H_{GM}} = \overline{I_{GM}} \cdot \overline{\omega} \tag{17}$$

where ŝ is a unit vector in the s direction. $\overline{I_{GM}}$ is the moment of inertia tensor of the GM.

Calculate $\overline{\omega}$

Since the GM is mounted to the DM, which is mounted to the case, the angular velocity of the GM in inertial space is given by the angular velocity of the GM gimbal, measurable relative to the DM, plus the motion of the DM, measurable relative to the case, plus the motion of the case. This is expressible as a vector sum of the separate angular velocities $$\overline{\omega} = \overline{\omega}_{s,i,o} + \overline{\omega}_{x,y,z} + \overline{\omega}_{a,b,c} = \dot{\theta}\hat{o} + \dot{\phi}_x\hat{x} + \dot{\phi}_y\hat{y} + \dot{\phi}_z\hat{z} + \dot{\gamma}_a\hat{a} + \dot{\gamma}_b\hat{b} + \dot{\gamma}_c\hat{c} \quad (18)$$

where $\theta$, $\phi$, $\gamma$ are angles of rotation for the GM, DM and case (or vehicle) axes, respectively. $\dot{\theta}$ relates that the motion of the GM is only about the o-axis. Further, we expect that the motion of the DM will only be about the y-axis, therefore, $$\overline{\omega} = \dot{\theta}\hat{o} + \dot{\phi}_y\hat{y} + \dot{\gamma}_a\hat{a} + \dot{\gamma}_b\hat{b} + \dot{\gamma}_c\hat{c} \quad (19)$$

The motion of the vehicle is unconstrained in inertial space.

Since we are interested in the motion of the GM in the s, i, o frame, we need to convert the latter terms in equation (19). We know the relationship between the s, i, o and x, y, z frames is a rotation about the o-axis. We apply the rotational transformation:

$$\hat{x} = \hat{s}\cos\vartheta - \hat{i}\sin\vartheta \cong \hat{s} - \hat{i}\vartheta \quad (20)$$

$$\hat{y} = \hat{i}\cos\vartheta + \hat{s}\sin\vartheta \cong \hat{i} + \hat{s}\vartheta$$

$$\hat{z} = \hat{o}$$

Since the GM is held at null, only small motions need to be considered, hence the small angle approximation is used.

We also know that the DM can only rotate about the y-axis, therefore the two axes are related by the rotational transformation:

$$\hat{a} = \hat{x}\cos\phi - \hat{z}\sin\phi \cong \hat{x} - \hat{z}\phi \quad (21)$$

$$\hat{b} = \hat{y}$$

$$\hat{c} = \hat{x}\sin\phi + \hat{z}\cos\phi \cong \hat{x}\phi + \hat{z}$$

The DM motion is also small hence the small angle approximation is again used. Substituting the rotations (20) and (21) into (19), we get $$\overline{\omega} = \omega_s\hat{s} + \omega_i\hat{i} + \omega_o\hat{o} \quad (22)$$

where $$\omega_s = (\theta\dot{\phi}_y + \dot{\gamma}_a + \theta\dot{\gamma}_b + \phi\dot{\gamma}_c), \omega_i = (\dot{\phi}_y - \theta\dot{\gamma}_a + \dot{\gamma}_b - \theta\phi\dot{\gamma}_c), \omega_o = (\dot{\theta} - \phi\dot{\gamma}_a + \dot{\gamma}_c) \quad (23)$$

Calculate $\overline{H}_{GM}$

The moment of inertia tensor for the GM is given by $$\overline{\overline{I}} = \begin{pmatrix} I_s & 0 & 0 \\ 0 & I_i & 0 \\ 0 & 0 & I_o \end{pmatrix} \quad (24)$$

assuming s, i, o are the principal axes of inertia for the GM. If s, i, o are not principal axes of inertia, it will generally be most convenient first to compute the vector components of $\overline{\overline{I}} \cdot \overline{\omega}$ along a set of principal axes and then to transform the vector $\overline{\overline{I}} \cdot \overline{\omega}$ into the s, i, o coordinate system. We assume that our designs have the appropriate symmetries.

Multiplying equation (22) by the moment of inertia tensor (24), and substituting into equation (17) gives $$\overline{H}_{GM} = \overline{\overline{I}} \cdot \overline{\omega} = \begin{pmatrix} I_s & 0 & 0 \\ 0 & I_i & 0 \\ 0 & 0 & I_o \end{pmatrix} \cdot (\omega_s\hat{s} + \omega_i\hat{i} + \omega_o\hat{o}) = I_s\omega_s\hat{s} + I_i\omega_i\hat{i} + I_o\omega_o\hat{o} \quad (25)$$

$$= H_{IMs}\hat{s} + H_{IMi}\hat{i} + H_{IMo}\hat{o} \quad (26)$$

where $$H_{IMs} = I_s\omega_s, H_{IMi} = I_i\omega_i, H_{IMo} = I_o\omega_o \quad (27)$$

Calculate $\overline{\omega} \times \overline{H}_{GM}$

The expression $\overline{\omega} \times \overline{H}_{GM}$ is given by $$\overline{\omega} \times \overline{H}_{GM} = \begin{vmatrix} \hat{s} & \hat{i} & \hat{o} \\ \omega_s & \omega_i & \omega_o \\ H_{GMs} & H_{GMi} & H_{GMo} \end{vmatrix} = (\omega_i H_{GMo} - \omega_o H_{GMi})\hat{s} - (\omega_s H_{GMo} - \omega_o H_{GMs})\hat{i} + (\omega_s H_{GMi} - \omega_i H_{GMs})\hat{o} \quad (28)$$

We will restrict ourselves to the o-axis solution since we will assume that motions of the GM about the other axes do not occur.

$$(\overline{\omega} \times \overline{H}_{GM})_o = \omega_s H_{GMi} - \omega_i H_{GMs} = \quad (29)$$

$$\omega_s I_i \omega_i - \omega_i I_s \omega_s = \omega_s \omega_i I_i - \omega_s \omega_i I_s = (I_i - I_s)\omega_s\omega_i$$

Calculate $$\frac{dH_{GMo}}{dt} + (\overline{\omega} \times \overline{H}_{GM})_o$$

to get the equation of motion.

$$\frac{dH_{GMo}}{dt} + (\overline{\omega} \times \overline{H}_{GM})_o = I_o\dot{\omega}_o + (I_i - I_s)\omega_s\omega_i \quad (30)$$

Substituting for $\omega_o$, $\omega_i$, $\omega_s$ and adding damping and spring terms to the motion of the GM, as well as the pendulous torque, we get the full GM Equation of Motion. The variables for the angles can change in rotational or oscillatory mode or both.

$$I_{GMo}\ddot{\vartheta} + D_{GM}\dot{\vartheta} + \quad (31)$$

$$\left\lfloor K_{GM} + \left(\dot{\phi}_y^2 + \dot{\phi}_y\dot{\gamma}_b - \dot{\gamma}_a^2 - \dot{\phi}\dot{\gamma}_a\dot{\gamma}_c + \dot{\phi}_y\dot{\gamma}_b + \dot{\gamma}_b^2 - \dot{\phi}\dot{\gamma}_a\dot{\gamma}_c - \phi^2\dot{\gamma}_c^2\right)\Delta I \right\rfloor$$

$$\vartheta - (\dot{\phi}_y\dot{\gamma}_a + \phi\dot{\phi}_y\dot{\gamma}_c + \dot{\gamma}_a\dot{\gamma}_b + \phi\dot{\gamma}_b\dot{\gamma}_c)\vartheta^2 =$$

$$I_{GMo}(\phi\ddot{\gamma}_a + \dot{\phi}\dot{\gamma}_a - \ddot{\gamma}_c) - \Delta I(\dot{\phi}_y\dot{\gamma}_a + \dot{\gamma}_a\dot{\gamma}_b + \phi\dot{\phi}_y\dot{\gamma}_c + \phi\dot{\gamma}_b\dot{\gamma}_c)$$

Note that: $\phi = \phi_y$, $\Delta I_{GM} = I_{GMi} - I_{GMs}$ where
  $\theta$ GM rotation angle relative to the DM,
  $\phi$ DM rotation angle relative to case,
  $\gamma_a$, $\gamma_b$, $\gamma_c$ case rotation angles.

Making substitutions for $\phi$ and $\dot\phi=\omega\tilde\phi\cos\omega t$ and $\dot\gamma_a=\Omega_a$, $\dot\gamma_b=\Omega_b, \dot\gamma_c=\Omega_c$, we get the final form for the equation of motion with all the angular rotation dependences.

$$I_{GMo}\ddot\vartheta + \tag{32}$$
$$D_{GM}\dot\vartheta + \left[K_{GM} + \left\{(\Omega_b^2 - \Omega_a^2) + \frac{1}{2}(\omega^2 - \Omega_c^2)\tilde\phi^2 - 2\Omega_a\Omega_c\tilde\phi\sin\omega t + 2\Omega_b\tilde\phi\omega\cos\omega t\right\}\Delta I\right]\vartheta -$$
$$(\Omega_a\Omega_b + \Omega_a\Omega_c\tilde\phi\sin\omega t + \Omega_a\tilde\phi\omega\cos\omega t)\vartheta^2 = I_{GMo}\Omega_a\tilde\phi\omega\cos\omega t -$$
$$\Delta I\left(\Omega_a\Omega_b + \Omega_b\Omega_c\tilde\phi\sin\omega t + \frac{1}{2}\Omega_c\sin2\omega t + \Omega_a\tilde\phi\omega\cos\omega t\right)$$

Bias Measurement
Carousel Method

The carousel method was first implemented by Delco to separate bias from the signal for in-plane instruments of an IMU consisting of two in plane gyroscopes and two in-plane accelerometers. The IMU was used in the Titan IIIC Space launch Vehicle. The performance result was orders of magnitude improvement in gyro and accelerometer bias stability. The approach used was to carousel the platform containing the instruments so that the Input Axis of the in-plane instruments were rotated about a Carousel Axis.

The rotation had the effect of modulating the signal in the presence of the bias (during the period of rotation). The peak-to-peak excursion of the signal was then related to the input rate. This technique proved effective with a low carousel rate because the larger instruments were and are much more stable than MEMS instruments. Therefore only long-term drift needed to be eliminated for the larger instruments. For MEMS instruments, however, in addition to long-term drift, there is a prominent 1/f bias instability, which limits performance. The solution of the invention is to carousel at a greater rotation rate to eliminate the bias drift and the 1/f bias instability.

Figure 13:
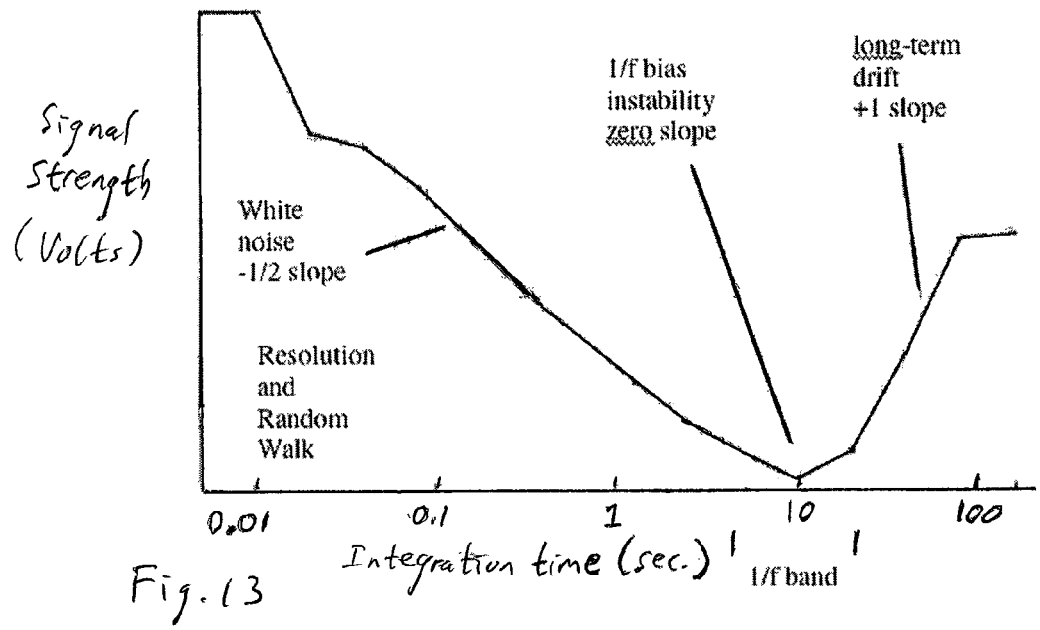
FIG. 13 is a graph of an Allan Deviation analysis and its relationship to 1/f bias instability and bias drift.

Relation of Bias Instability to Allan Deviation Analysis:

The carousel rate necessary for MEMS instruments can be related to the Allan Deviation analysis used to quantize bias instability, white noise and long-term drift as shown in FIG. 13. The white noise is shown as the −½ slope characteristic. In the analysis, as the integration time is increased, the white noise magnitude is decreased with maximum resolution available at the bottom of the characteristic. The white noise also determines the angle random walk for the gyroscope and the velocity random walk for the accelerometer. The bias instability is the level of the zero slope characteristic, which is due to 1/f noise, originating primarily in the electronics. The +1 slope characteristic rises to the right at the larger integration times. This characteristic is due to long-term drift. Long-term drift is primarily due to device instability influenced by temperature changes, stress and aging. From the integration times can be calculated the carousel rate. By increasing the carousel rate, the long-term and 1/f instability can be reduced in the output signal. The maximum, practical rotation rate is the value that results in only the white noise characteristic. The minimum rotation rate depends on the intersection of the white noise and 1/f characteristics. An even larger rate would not appreciably reduce the bias instability but may aid the signal processing.

Figure 14:
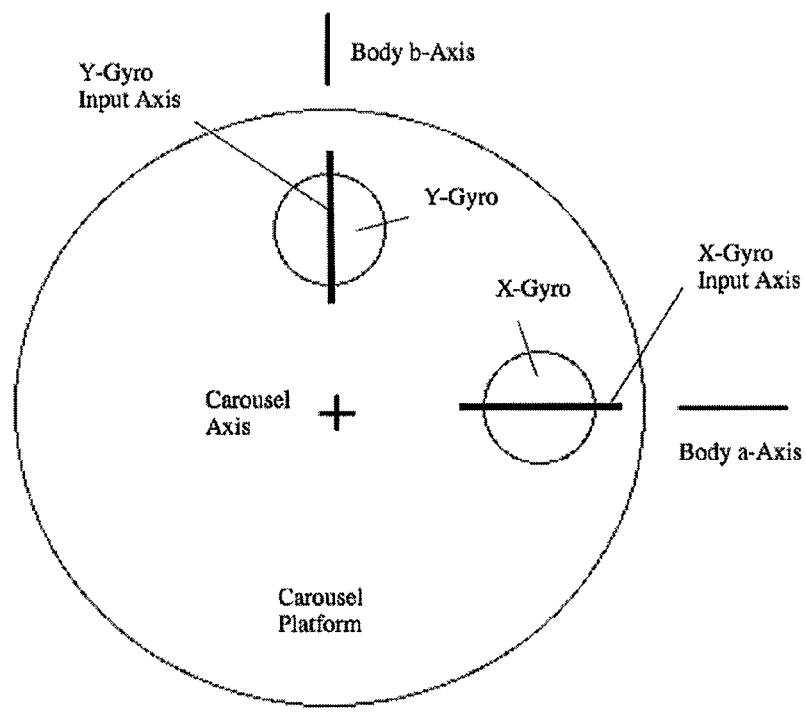
FIG. 14 is a top schematic view of a carousel mechanization with two in-plane gyroscopes.

Carousel Mechanization for a Planar IMU (FIG. 14):

The planar IMU contains X, Y and Z-gyroscopes. See, for example, U.S. Pat. Nos. 6,859,751 and 6,725,719, incorporated herein by reference. The plane of the IMU is parallel to the plane of the carousel platform. The input axis of the Z-Gyro (not shown) is aligned with the Carousel Axis. The Input Axes of the X, Y gyroscopes (in-plane gyros) are orthogonal and lie in the plane of the platform. The carousel is rotated about the Carousel Axis. Its motion is intended to stabilize the X, Y gyroscopes. The Input Axes of the X, Y gyros are also co-planar with two orthogonal Body Axes (a-Axis and b-Axis) of the vehicle as shown in FIG. 14. The Body Axes are fixed to the vehicle and the X, Y Axes rotate with the Input Axes of the X, Y gyroscopes. As the carousel rotates, the Input Axes of the two orthogonal gyroscopes rotate in the plane with the carousel platform and about the Carousel Axis.

For the case of the X-gyro and a single input rate, about the Body a-Axis, the signal of the X-gyro is at peak value when its Input Axis is aligned with the a-Axis. The signal is zero when aligned with the b-Axis (no rate) and is at the minus peak value when aligned with the negative a-Axis. The signal is therefore modulated as the cosine of the carousel angle with respect to the a-Axis (constant amplitude if the input rate is constant). For the Y-gyro the modulation is sinusoidal with respect to the a-Axis.

Figure 15:
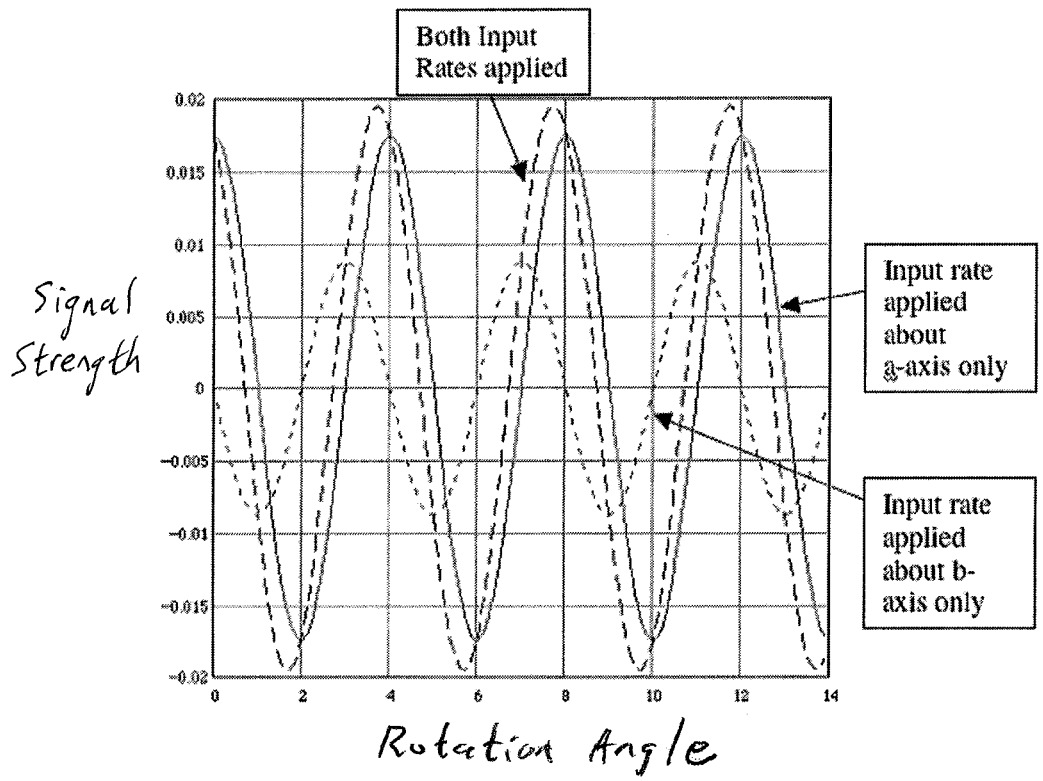
FIG. 15 is a graph showing sample signal waveforms generated during rotation of the carousel shown in FIG. 14.

For the case of two input rates, about the Body a-Axis and the Body b-Axis, the rotating X-gyroscope will sense both Input Rates, as will the rotating Y-gyroscope. In FIG. 15, are shown graphically, two separate signals from two input rates phase shifted by 90 degrees of rotation angle. The sum shows an oscillation with a different amplitude and phase.

For the case of two input rates and with both the X and Y-gyroscopes operating at the same time, an equal but phase-shifted sum is obtained.

The same discussion applies for in-plane accelerometers.

Carousel Algorithm:

The function of the algorithm is to separate the components of the sum gyro signal from each input rate about the two body axes. This is done by mixing the sum signal with two waveforms, phase-shifted by 90 degrees that are referenced to the Body a-Axis and b-Axis. A resolver (pick-off) is used to measure the rotation angle of the carousel to obtain the reference waveforms.

Figure 16:
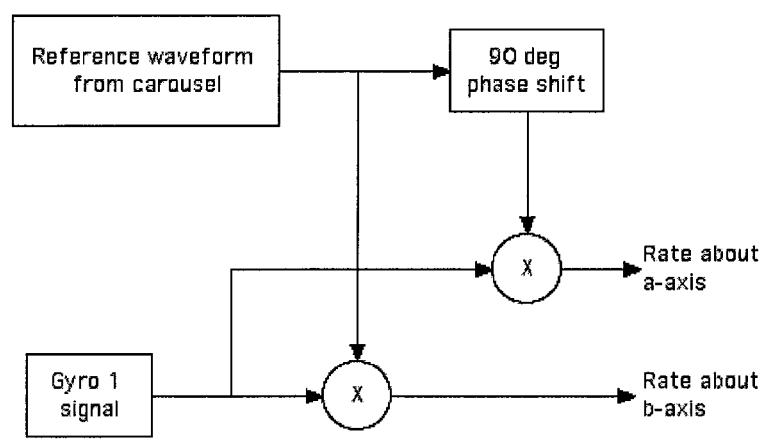
FIG. 16 is a schematic of an algorithm for separating signals from orthogonal input rates.

The schematic of FIG. 16 shows that the signal from the X-gyro is split. The waveform referenced with the a-Axis is then mixed with the signal to obtain the input rate about the a-Axis. The second waveform, shifted by 90 degrees from the first, is mixed with the gyro signal to obtain the input rate about the b-Axis. This is the phase-sensitive detection method as used in lock-in analyzers.

The reference waveforms can be square-wave or sinusoidal.

In summary, carousel rotation is used to modulate the gyro signal and phase-sensitive detection is used to separate the gyro signal proportional to input rates about both Body a-Axis and b-axis.

To be effective, the carousel rate needs to be faster than the frequency of the instability. For the 1/f instability, the carousel rate should be faster than the lowest integration time of the 1/f band in the Allan Deviation analysis. In effect, the gyro is made to sense input rate in a time duration that is shorter than the time it takes for the bias to change.

The lock-in technique (phase sensitive detection) was invented to improve the accuracy of measurements by speeding up the time in which the measurement is made, before the instability occurs. Or, equivalently, by shifting the measurement frequency beyond the drift and 1/f noise and into the white noise region. This is the state of the art method used in all sensor systems: the measurand is excited at very high frequencies with a sinusoidal voltage (or square), the response occurs at the same frequency and it is measured, the high frequency signal is then demodulated with the same excitation waveform to obtain a dc value proportional to the input.

In the carousel application, the carousel motion excites the gyro at the carousel rate while it is measuring the input rate. The angle resolver (pick-off) is used to generate the reference waveform.

A requirement of the gyroscope and the accelerometer is that the instruments have the bandwidth to respond to the carousel rate.

The same discussion applies for in-plane accelerometers.

G1-Gyroscope:

The structure is identical to the G2 gyroscope. The roles of the innermost members are reversed. For the G1 gyroscope, the inner member is driven into oscillation by the rotary combs and the amplitude of the oscillation sensed. The gyroscope response to the same Input Axis is given by the oscillation of the gyro outer member. The axes of the oscillations is defined by the flexures. The inner member oscillates about the Drive Axis which is now normal to the plane. The gyro outer member oscillates about the Output Axis, which is now in the plane.

Other Planar Gyroscopes:

In addition to the G1 gyroscope and G2 gyroscope, the invention applies to other planar gyroscopes having the Input Axis in the plane.

Two Gyro and Two Accelerometer IMU, Reduced IMU:

Because each in-plane gyro senses both input rates about Body a-Axis and b-Axis, then only one in-plane gyro is sufficient. The second in-plane gyro is redundant. The benefit of the one gyro application is that both input rates are made by the same instrument, so there is no relative uncertainty between the two measurements. The IMU performance is improved. The same discussion applies to the accelerometer.

The IMU size and complexity can be reduced by using one Z-gyro, one in-plane gyro, one Z-accelerometer and one in-plane accelerometer.

In-Plane Gyro and Accelerometer, Requirements:

It is important that the Carousel Axis is orthogonal to the in-plane gyro otherwise it will sense the carousel rotation. This also applies to the in-plane accelerometer.

It is important that the in-plane instruments are not affected or de-stabilized by the carousel rotation. The G2-gyroscope described above has proven to be insensitive to the cross-axis carousel rotation.

The in-plane accelerometers will sense the carousel rate as well as vehicle rotation about the Body c-Axis. Two accelerometers for each in-plane axis can be used to cancel the rotation dependent signal. If the carousel rate is maintained constant, then the rotation sensitivity becomes a large stable bias that is also filtered by the invention.

Planar IMU with Carousel

Figure 17:
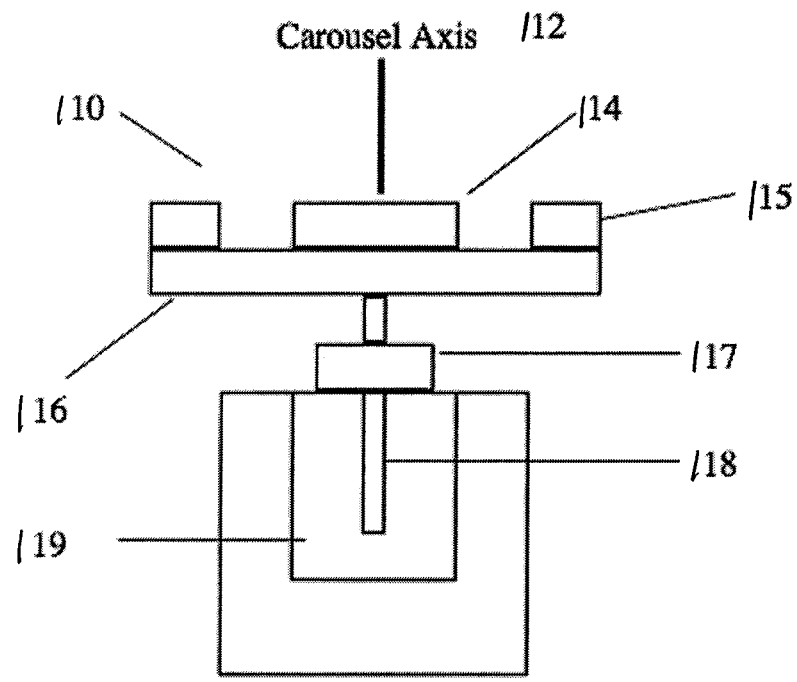
FIG. 17 is a schematic side view of one example of carousel mechanization for the invention.

An embodiment of the carousel mechanization is illustrated in FIG. 17. In the carousel 110 implementation, planar IMU 114 is mounted on the carousel platform 116 with its Z-axis aligned with the Carousel Axis 112, which is aligned with the Body c-Axis. A motor 119 is used to drive the carousel rotation. An angle resolver 117 is used to measure the carousel rotation angle. The resolver zero is aligned with the Body a-Axis. The 90 degree angle will be aligned with the Body b-Axis.

In one embodiment, proximity electronics 115 for the instruments will be located on the platform with the Planar IMU. The control electronics (not shown) are located off the carousel and on the vehicle (not shown). The two sets of electronics are connected via a slip ring assembly 118 in the carousel. The number of slip rings depends on the number of instruments on the platform.

With miniaturization of the electronics, the carousel can contain the full electronics on the platform and reduce the number of slip rings needed. If a battery is used it can also be mounted on the platform. Transmission of the outputs can also be made wirelessly to the system. A carousel without slip-rings is possible.

Figure 18:
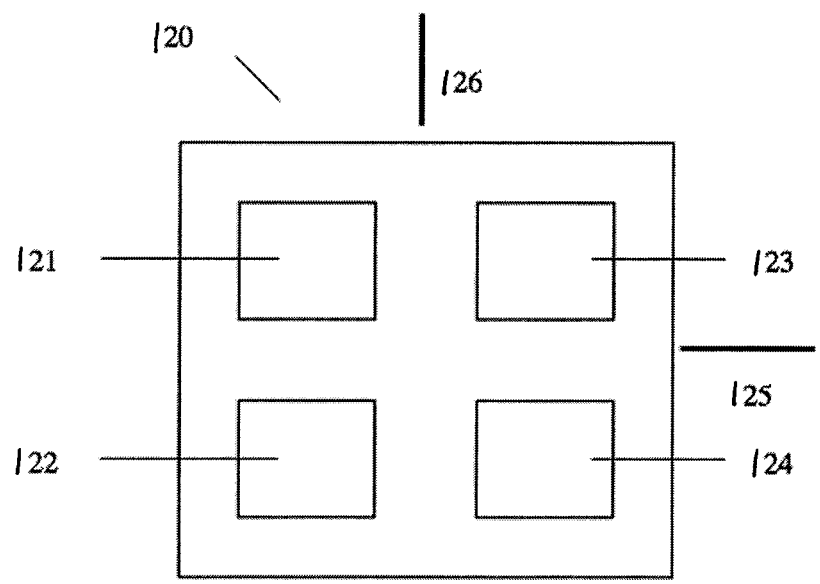
FIG. 18 is a schematic view of a small IMU that can be used along with carousel rotation.

Reduced Planar IMU with Carousel:

Reduced IMU 120 is illustrated in FIG. 18. Carouseling reduces the number of instruments required for the Six Degree-of-freedom IMU. Reduced IMU 120 comprises one Z-Gyro 121, one in-plane G2-Gyro 122, one Z-Accelerometer 123, and one in-plane Linear Accelerometer 124. The X-Axis 125 and Y-Axis 126 lie in and thus define the plane of the IMU.

This embodiment states that only one in-plane gyroscope is needed to sense input rotation rates about two in-plane vehicle Body Axes.

This embodiment states that only one in-plane accelerometer is needed to sense input acceleration along two in-plane vehicle Body Axes.

Algorithm:

The algorithm addresses the greater instability of small, MEMS gyroscopes and accelerometers. The carousel rate needs to be sufficiently high so that the 1/f bias instability can be removed from the measurement. The carousel rate is tied to the Allan Deviation analysis and the 1/f integration band. The carousel rate is also dependent on the method of processing the modulated signals whether the processing method is numerical or electronic.

Specific features of the invention are shown in some drawings and not others, but this is not a limitation of the invention, the scope of which is set forth in the following claims.

What is claimed is:

1. A MEMS integrated inertial measurement unit (IMU) for a vehicle that has body X and Y axes, comprising:
  a) a substrate;
  b) at least two, coplanar, inertial measurement instruments, both coupled to the substrate, the inertial measurement instruments comprising a generally planar single degree of freedom (DOF) MEMS gyroscope and a generally planar single DOF MEMS accelerometer, each inertial measurement instrument comprising a planar sensing member, wherein each inertial measurement instrument exhibits a bias instability that has a frequency, and wherein each inertial measurement instrument defines an input axis that is in the plane of the sensing member and is aligned with either the body X axis or the body Y axis;
  c) wherein the gyroscope is adapted to sense rotations of the substrate about the gyroscope input axis and is essentially insensitive to rotations about two axes that are each orthogonal to the gyroscope input axis, to accomplish a single DOF gyroscope, the gyroscope having a gyroscope output signal that is related to the rate of rotation about the gyroscope input axis;
  d) wherein the accelerometer is adapted to sense accelerations of the substrate along the accelerometer input axis and is essentially insensitive to accelerations about two axes that are each orthogonal to the accelerometer input axis, to accomplish a single DOF accelerometer, the accelerometer having an accelerometer output signal that is related to the rate of acceleration along the accelerometer input axis;

e) a planar platform that carries the substrate and that defines a platform plane that is essentially parallel to the planes of the planar sensing members, such that the input axes of the gyroscope and the accelerometer are essentially parallel to the platform plane;

f) a system that rotates the platform through 360 degrees at a constant rotation rate about a platform rotation axis that is orthogonal to the platform plane, the rotation at a frequency that is greater than the bias instability frequency;

g) a pick-off that is used to measure the rotation angle of the platform and generate a reference waveform; and h) a phase-sensitive detection system that:
  i) mixes the reference waveform with the gyroscope output signal to obtain the rotation rate about the gyroscope input axis;
  ii) mixes the reference waveform with the accelerometer output signal to obtain the acceleration rate about the accelerometer input axis;
  iii) phase shifts the reference waveform by 90 degrees;
  iv) mixes the phase-shifted waveform with the gyroscope output signal to obtain the rotation rate about an axis in the plane of the sensing member and orthogonal to the gyroscope input axis; and
  v) mixes the phase-shifted waveform with the accelerometer output signal to obtain the acceleration rate about an axis in the plane of the sensing member and orthogonal to the accelerometer input axis.

2. A bias-stabilized planar MEMS integrated inertial measurement sensor unit for a vehicle that has orthogonal vehicle body X, Y and Z axes, comprising:

a) a planar substrate that defines a substrate plane that is parallel to the body X and Y axes, wherein the substrate plane is orthogonal to a substrate Z axis that is itself parallel to the body Z axis and where the substrate has orthogonal substrate X and Y axes;

b) one or more planar inertial measurement sensors coupled to the substrate, each sensor comprising a planar sensing member that defines a plane that is parallel to the plane of the substrate, wherein each sensor defines an input axis that is in the plane of the sensing member and is aligned with either the substrate X axis or the substrate Y axis;

c) wherein each sensor is adapted to sense either rotations of the substrate about the sensor input axis or accelerations of the substrate along the sensor input axis, wherein each sensor is essentially insensitive to rotations or accelerations about or along two axes that are each orthogonal to the sensor input axis;

d) wherein each sensor has a sensor output signal that is related to either a rotation rate about the sensor input axis or an acceleration along the sensor input axis;

e) a planar platform that carries the substrate and that defines a platform plane that is parallel to the planes of the planar sensing members, such that the input axes of the sensing members are parallel to the platform plane;

f) a system that rotates the platform through 360 degrees at a constant spin rate about a platform rotation axis that is orthogonal to the platform plane;

g) a resolver that is used to measure a rotation angle of the platform relative to the vehicle body Z axis and generate a reference waveform; and h) a phase-sensitive detection system that for each sensor:
  (i) mixes the reference waveform with a sensor output signal to obtain either the rotation rate about the sensor input axis or the acceleration along the sensor input axis;
  (ii) aligns the reference waveform with either the vehicle X or Y body axis to obtain either the rotation rate about the body X or Y axis or the acceleration along the body X or Y axis;
  (iii) phase shifts the reference waveform by 90 degrees to align with either the vehicle Y or X body axis, to obtain either the rotation rate about the body Y or X axis or acceleration along the body Y or X axis; and
  (iv) low pass filters the rotation rate and the acceleration outputs obtained by phase sensitive detection to filter unwanted high frequency instability, at least some of which is caused by the mixing process.

3. The bias-stabilized planar MEMS integrated inertial measurement sensor unit of claim 2 comprising two inertial sensors.

4. The bias-stabilized planar MEMS integrated inertial measurement sensor unit of claim 3 wherein a first sensor is a gyroscope with its input axis in the plane of the substrate and a second sensor is an accelerometer with its input axis in the plane of the substrate, the two sensors making up a first sensing unit.

5. The bias-stabilized planar MEMS integrated inertial measurement sensor unit of claim 4 comprising four inertial sensors.

6. The bias-stabilized planar MEMS integrated inertial measurement sensor unit of claim 5 wherein a third sensor is a gyroscope with its input axis orthogonal to the plane of the substrate, and the fourth sensor is an accelerometer with its input axis orthogonal to the plane of the substrate, the third and fourth sensors making up a second sensing unit.

7. The bias-stabilized planar MEMS integrated inertial measurement sensor unit of claim 6 wherein the third sensor is used to measure the spin rate of the platform and the fourth sensor is used to measure the acceleration of the vehicle along the Z body axis.

8. The bias-stabilized planar MEMS integrated inertial measurement sensor unit of claim 2 wherein each sensor exhibits a bias instability extending from and including DC that occupies a bias instability frequency band, and wherein the platform is spun at a rotation frequency that is greater than the bias instability frequency band.

9. The bias-stabilized planar MEMS integrated inertial measurement sensor unit of claim 2 wherein the reference waveform is either sinusoidal or square shaped at the spin frequency.

10. The bias-stabilized planar MEMS integrated inertial measurement sensor unit of claim 2 wherein the sensors are single degree of freedom designs and are thus insensitive to cross-axis vehicle motion.

11. The bias-stabilized planar MEMS integrated inertial measurement sensor unit of claim 2 further comprising slip rings that are used to provide power to the sensors and to convey signals from the sensors on the platform.

12. The bias-stabilized planar MEMS integrated inertial measurement sensor unit of claim 2 further comprising wireless devices that are used to provide power to the sensors and to convey signals from the platform.

13. A bias-stabilized planar MEMS integrated inertial measurement sensor unit for a vehicle that has orthogonal body X, Y and Z axes, comprising:

a) a planar substrate that defines a substrate plane that is parallel to the body X and Y axes, wherein the substrate plane is orthogonal to a substrate Z axis that is itself parallel to the body Z axis and wherein the substrate has orthogonal substrate X and Y axes;

b) one or more single degree of freedom planar inertial measurement sensors coupled to the substrate, each sensor comprising a planar sensing member that is insensitive to cross-axis vehicle motion and defines a plane that is parallel to the plane of the substrate, wherein each sensor defines an input axis that is in the plane of the sensing member and is aligned with either the substrate X axis or the substrate Y axis;

c) wherein each sensor is adapted to sense either rotations of the substrate about the sensor input axis or accelerations of the substrate along the sensor input axis, wherein each sensor is essentially insensitive to rotations or accelerations about or along two axes that are each orthogonal to the sensor input axis;

d) wherein each sensor has a sensor output signal that is related to either a rotation rate about the sensor input axis or an acceleration along the sensor input axis;

e) a planar platform that carries the substrate and that defines a platform plane that is parallel to the planes of the planar sensing members, such that the input axes of the sensing members are parallel to the platform plane;

f) wherein each sensor exhibits a bias instability extending from and including DC that occupies a bias instability frequency band, and wherein the platform is spun at a rotation frequency that is greater than the bias instability frequency band g) a system that rotates the platform through 360 degrees at a constant spin rate about a platform rotation axis that is orthogonal to the platform plane;

h) a resolver that is used to measure a rotation angle of the platform relative to the vehicle body Z axis and generate a sinusoidal or square wave reference waveform at the spin frequency; and i) a phase-sensitive detection system that for each sensor:
 (i) mixes the reference waveform with a modulated sensor output signal to obtain either the rotation rate about the sensor input axis or the acceleration along the sensor input axis;
 (ii) aligns the reference waveform with either the vehicle X or Y body axis to obtain either the rotation rate about the body X or Y axis or the acceleration along the body X or Y axis;
 (iii) phase shifts the reference waveform by 90 degrees to align with either the vehicle Y or X body axis, to obtain either the rotation rate about the body Y or X axis or acceleration along the body Y or X axis; and
 (iv) low pass filters the rotation rate and the acceleration outputs obtained by phase sensitive detection, to filter unwanted high frequency instability, at least some of which is caused by the mixing process.

14. The bias-stabilized planar MEMS integrated inertial measurement sensor unit of claim 13 comprising two inertial sensors, wherein a first sensor is a gyroscope with its input axis in the plane of the substrate and a second sensor is an accelerometer with its input axis in the plane of the substrate, the two sensors making up a first sensing unit.

15. The bias-stabilized planar MEMS integrated inertial measurement sensor unit of claim 14 comprising four inertial sensors, wherein a third sensor is a gyroscope with its input axis orthogonal to the plane of the substrate, and the fourth sensor is an accelerometer with its input axis orthogonal to the plane of the substrate, the third and fourth sensors making up a second sensing unit.

16. The bias-stabilized planar MEMS integrated inertial measurement sensor unit of claim 15 wherein the third sensor is used to measure the spin rate of the platform and the fourth sensor is used to measure the acceleration of the vehicle along the Z body axis.

* * * * *